United States Patent [19]

Knight

[11] 3,891,004

[45] June 24, 1975

[54] BOTTOM CROSS-OVER LOADING ARM

[75] Inventor: Houston W. Knight, Whittier, Calif.

[73] Assignee: FMC Corporation, San Jose, Calif.

[22] Filed: Aug. 24, 1973

[21] Appl. No.: 391,415

[52] U.S. Cl. ............................................. 137/615
[51] Int. Cl. ............................................. F17d 1/00
[58] Field of Search ...... 137/615, 276, 279, 355.24, 137/355.25, 342, 343; 138/107, 155, 177; 141/387, 388

[56] References Cited
UNITED STATES PATENTS

| | | | |
|---|---|---|---|
| 3,021,867 | 2/1962 | Gallagher | 137/615 X |
| 3,086,552 | 4/1963 | Ragsdale | 137/615 |
| 3,249,121 | 5/1966 | Bily | 137/615 |
| 3,587,643 | 6/1971 | Bahr | 137/615 |
| 3,678,972 | 7/1972 | Swindler | 137/615 X |

*Primary Examiner*—Charles J. Myhre
*Assistant Examiner*—Ira S. Lazarus
*Attorney, Agent, or Firm*—W. W. Ritt, Jr.; C. E. Tripp

[57] ABSTRACT

An articulated fluid loading arm especially for transferring gasoline or other fuels from a bulk storage reservoir into the bottom of a tank truck or other fluid transport vehicle. The arm is pivotally mounted on a generally vertical riser, and includes an inboard arm section connected to the riser through a vertical swivel joint assembly, an outboard arm section connected to the inboard section through another vertical swivel joint assembly, and a coupling assembly, connected to the outboard arm section by a horizontal swivel joint assembly, for coupling the arm to the inlet of a tank or the like. The outboard arm section comprises inner and outer pipe members interconnected through a horizontal swivel joint assembly that facilitates pivoting the outer member with respect to the inner member about a horizontal axis, and the outer member and the coupling assembly are counterbalanced about this horizontal axis by a counterweight or any of several other systems including springs, fluid cylinders, and gear assemblies.

9 Claims, 21 Drawing Figures

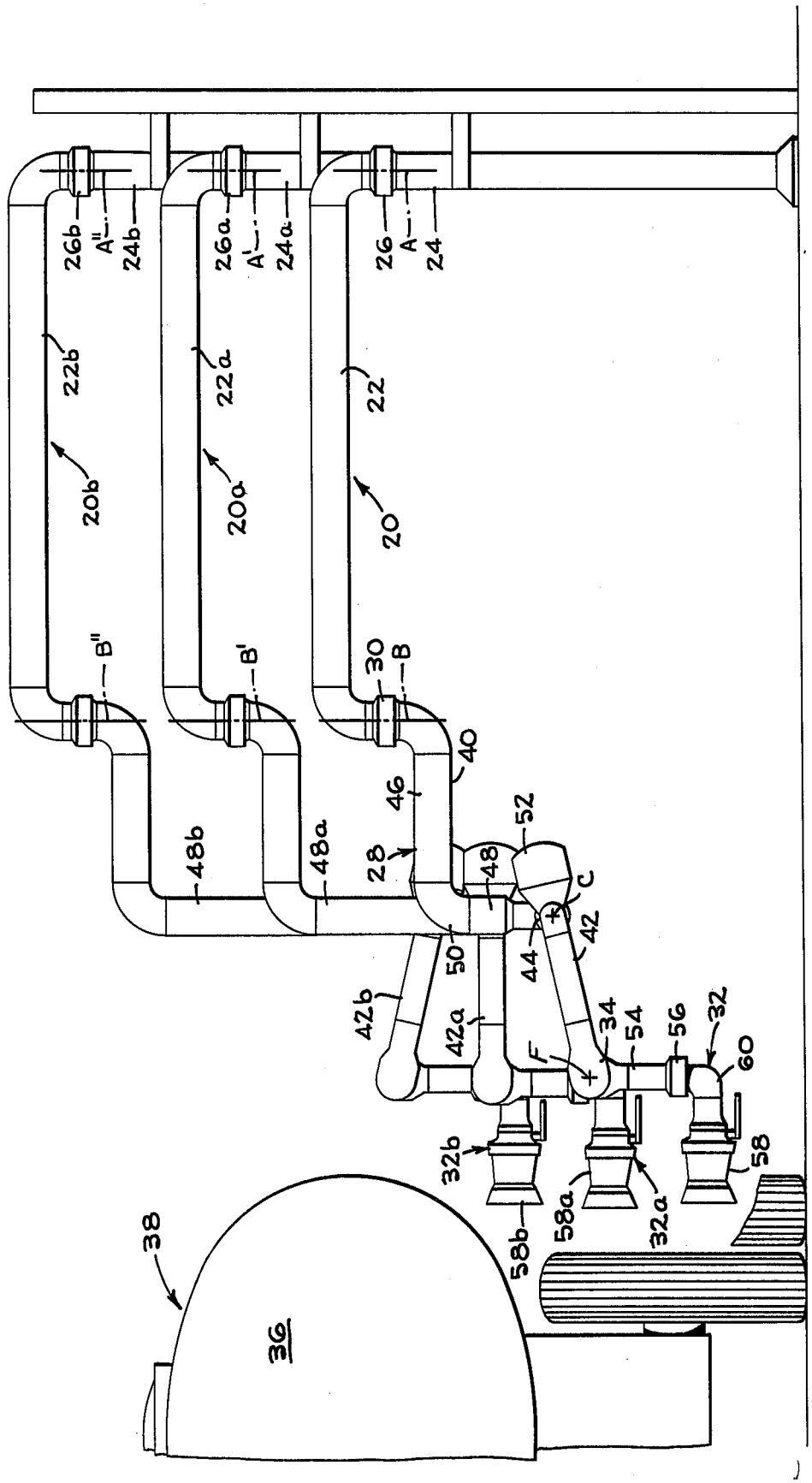

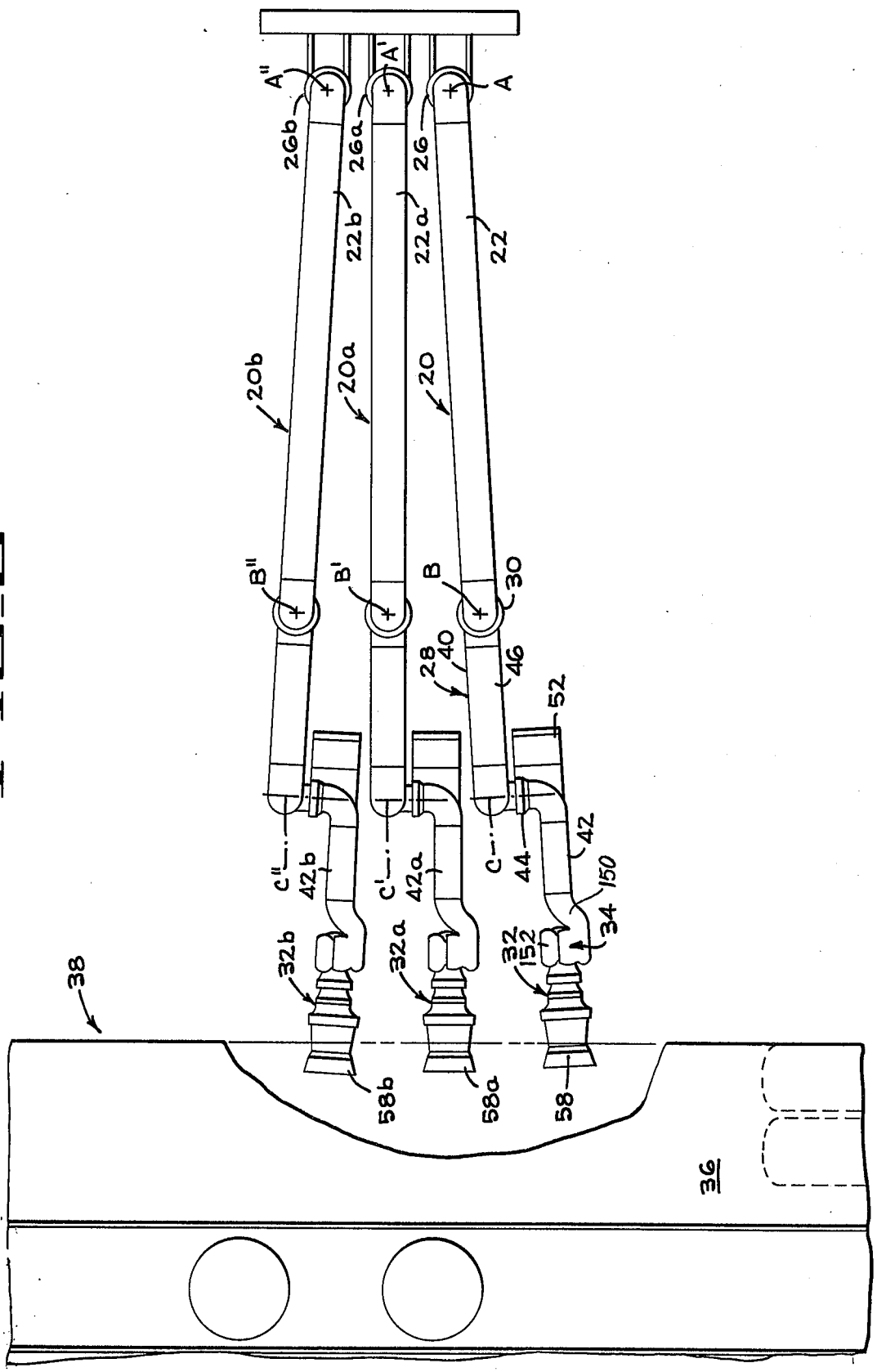

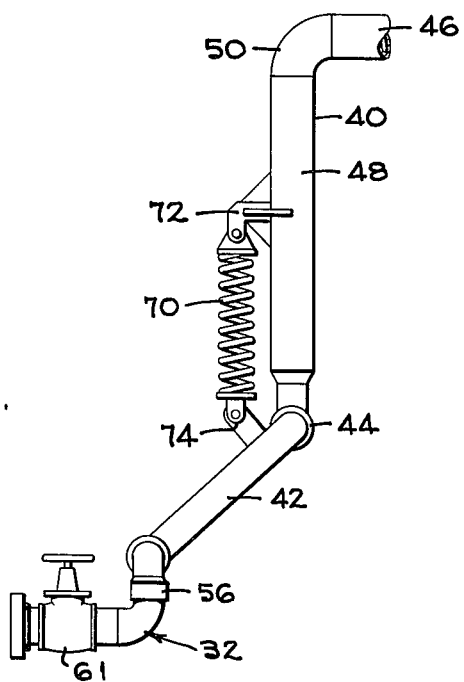
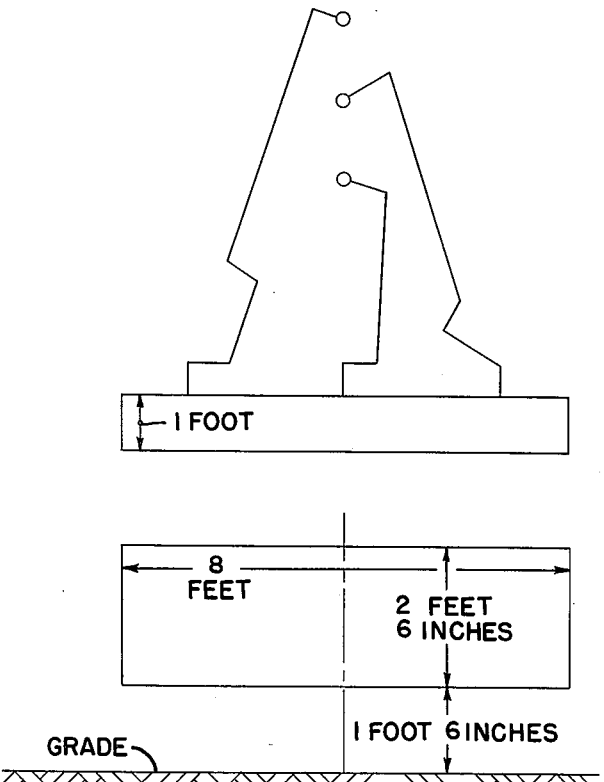
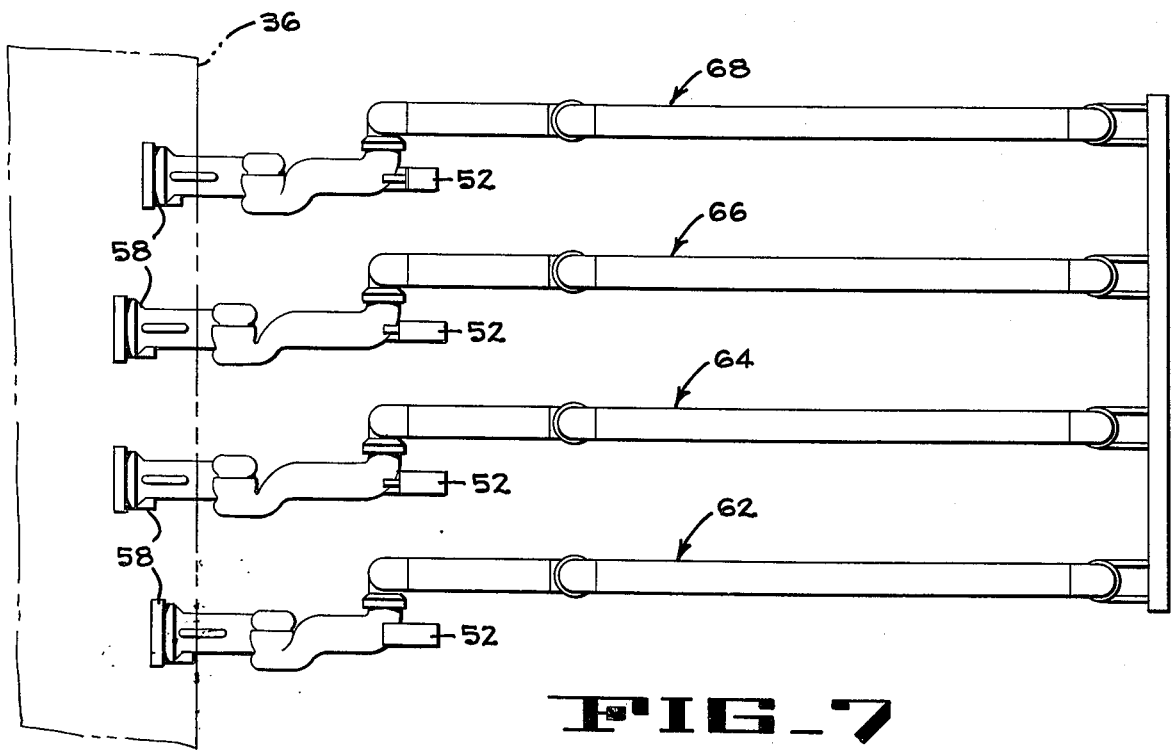

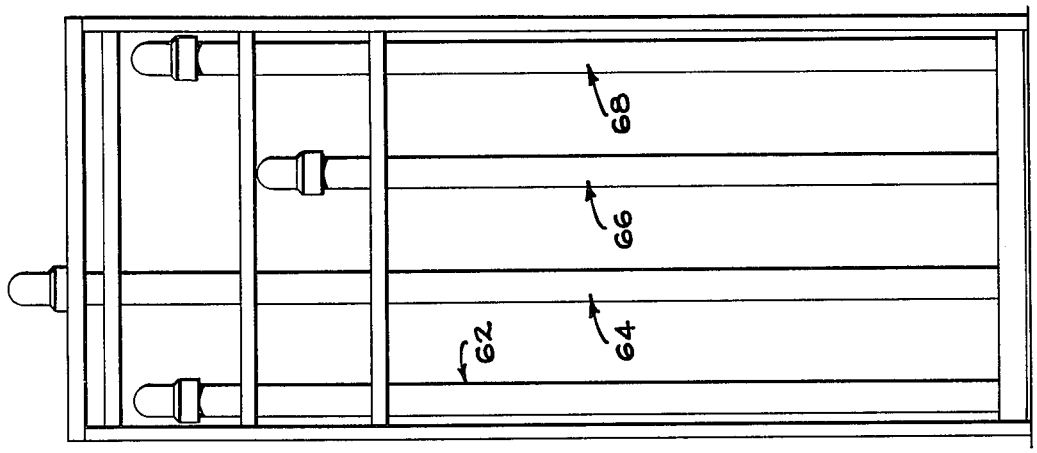
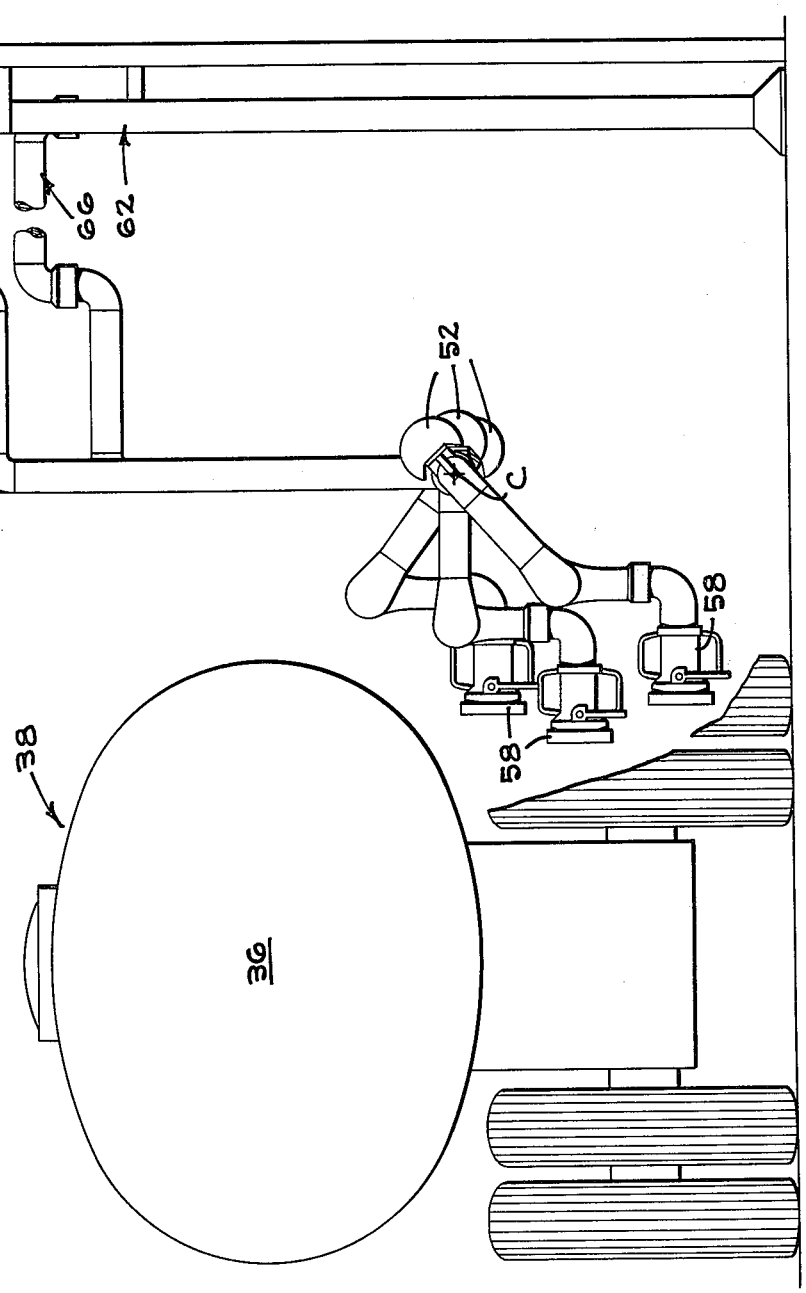

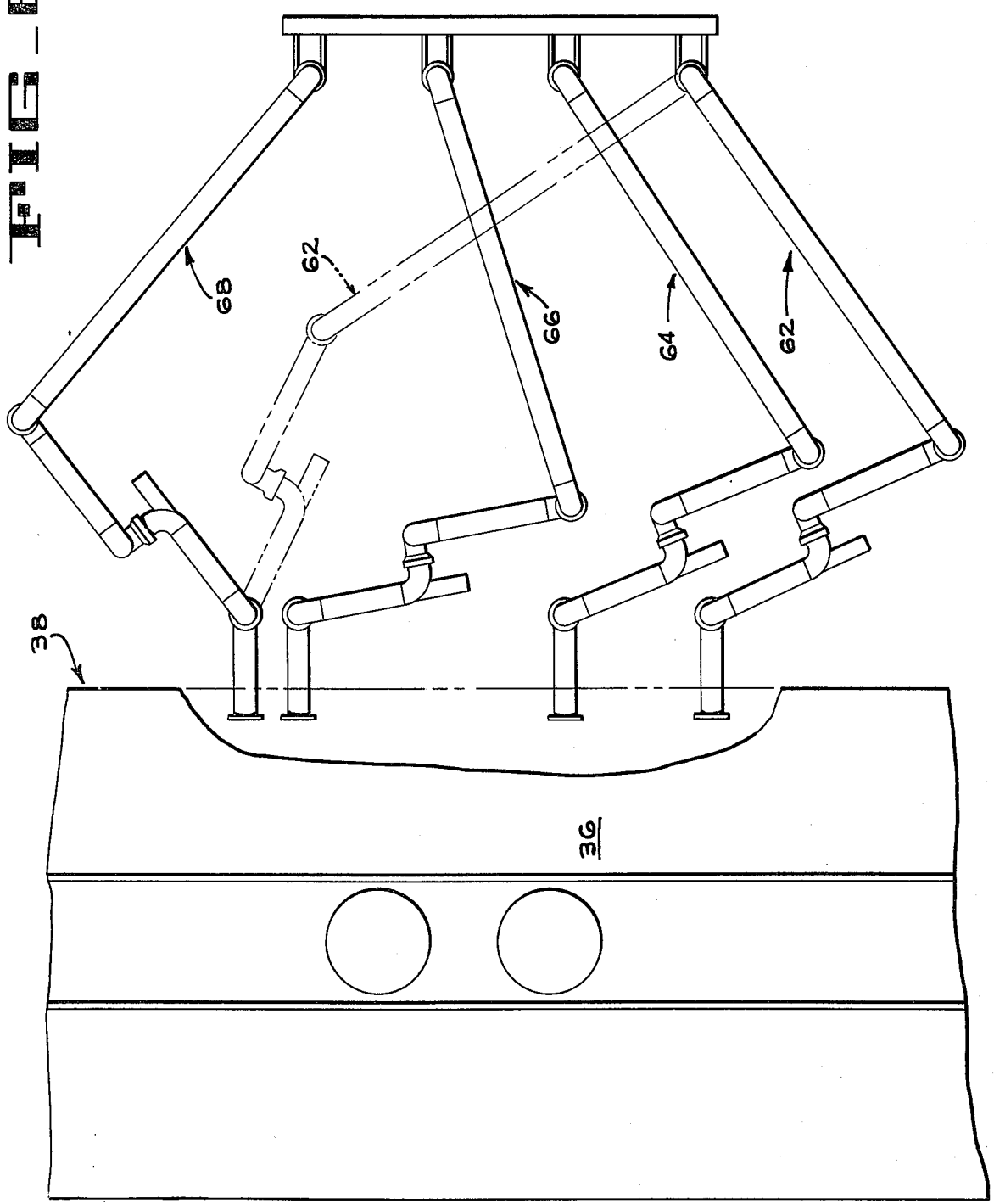

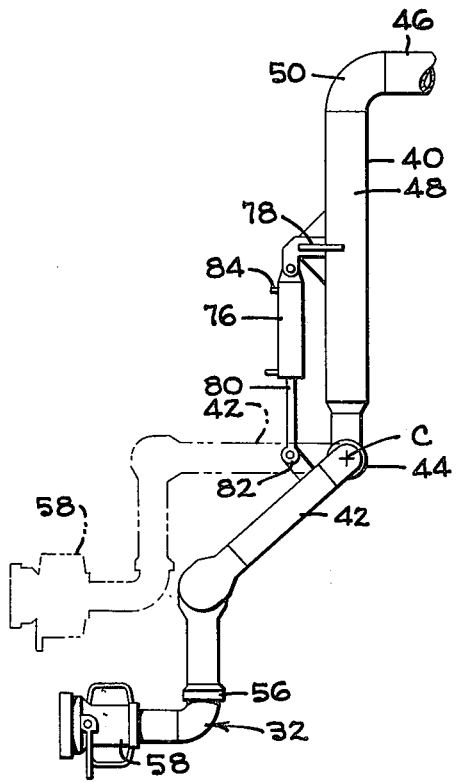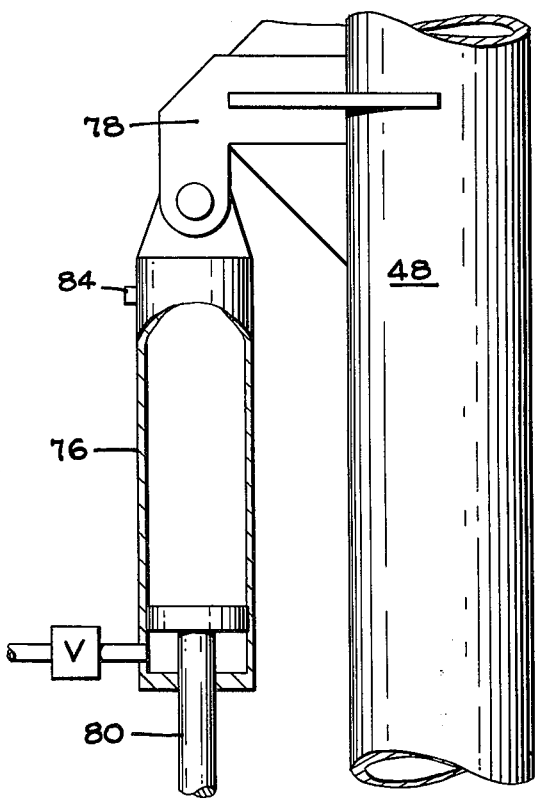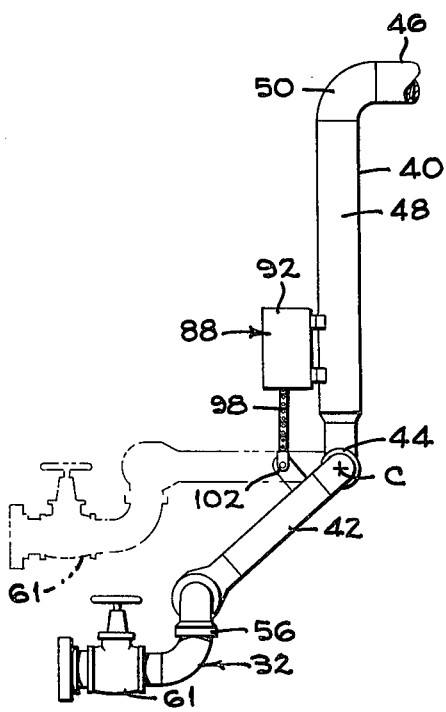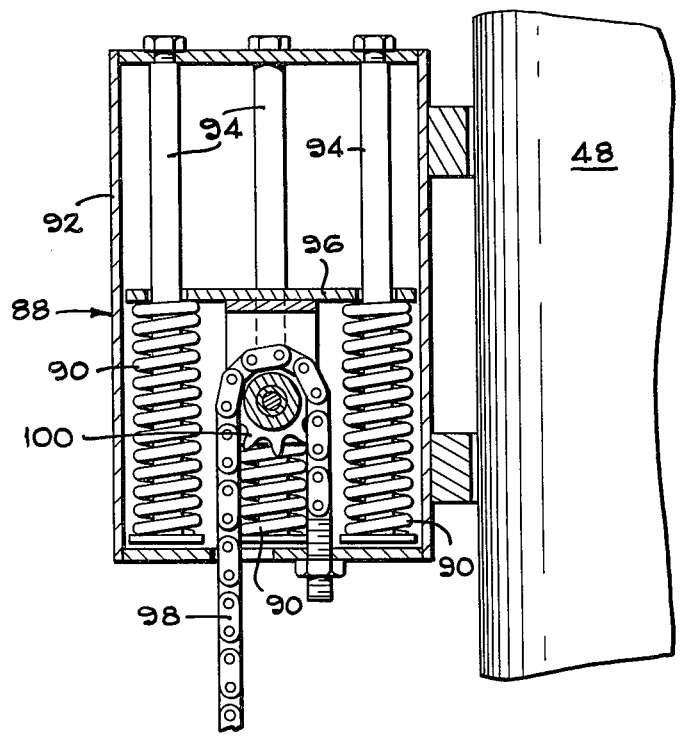

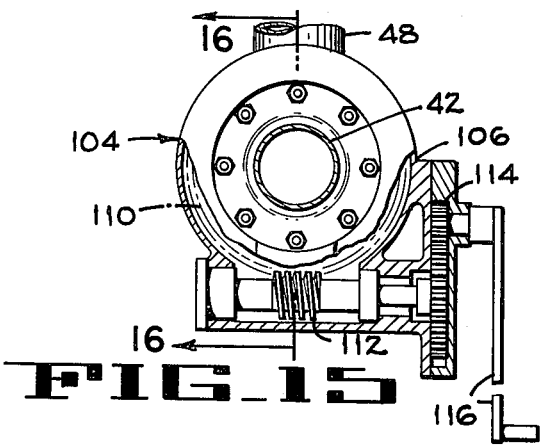
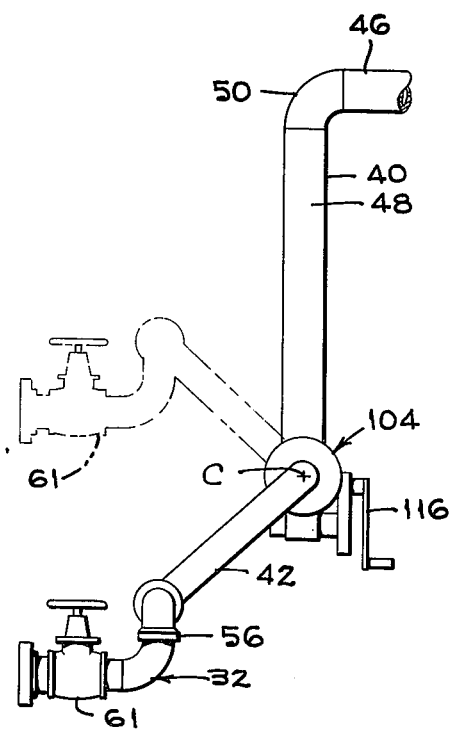
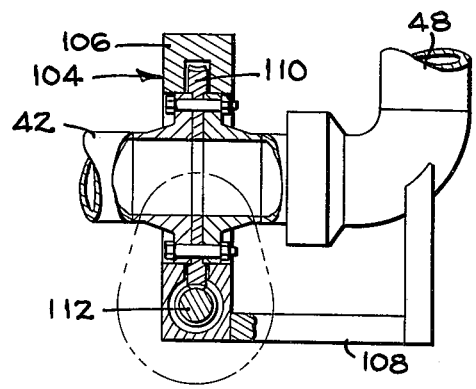
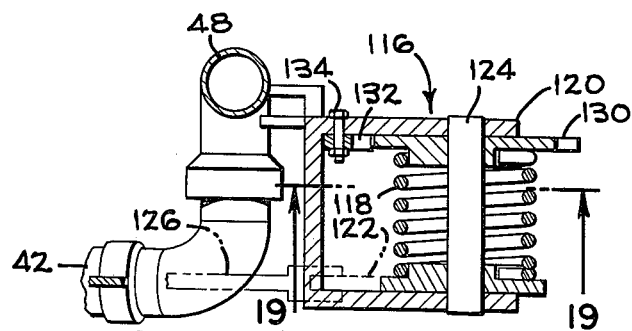
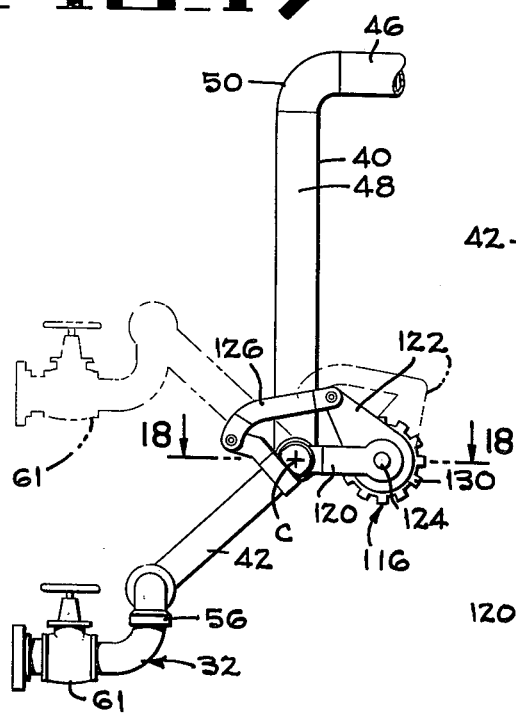
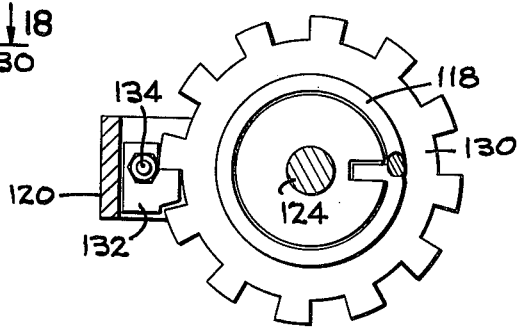

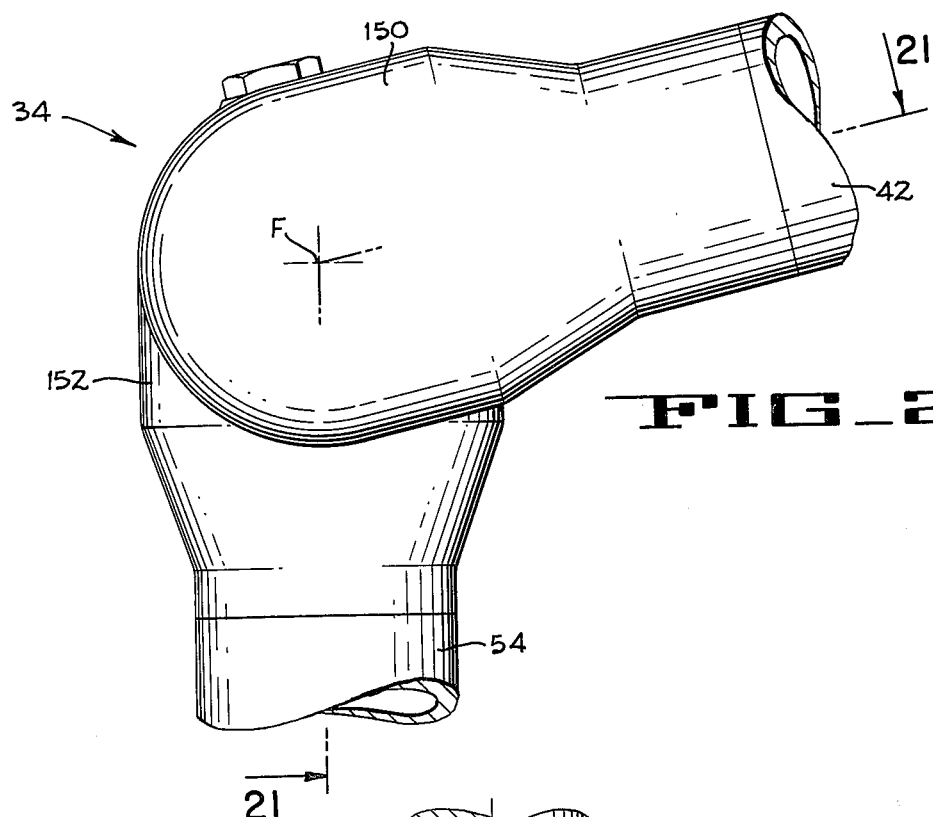
FIG_20
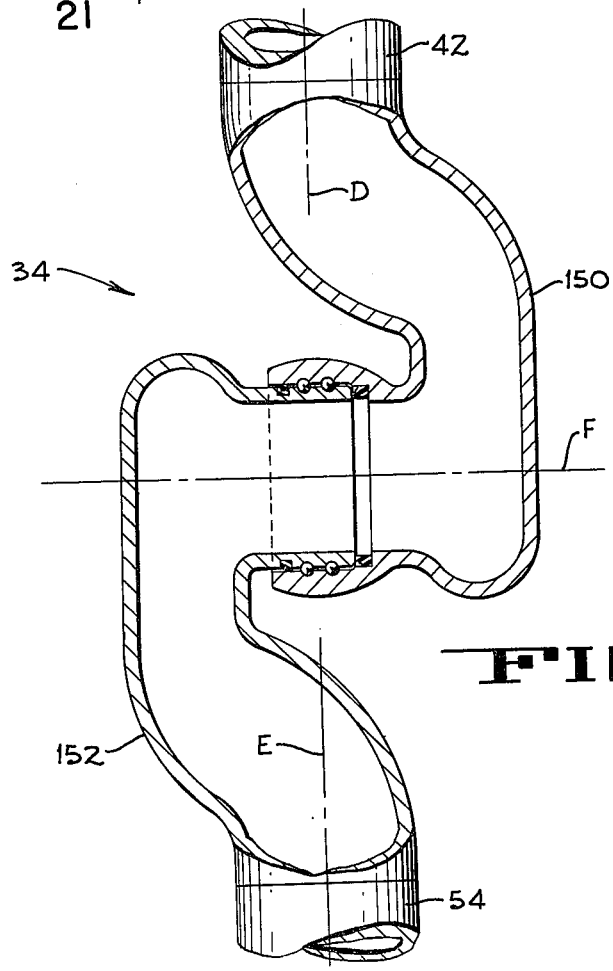
FIG_21

BOTTOM CROSS-OVER LOADING ARM

BACKGROUND OF THE INVENTION

This invention relates to apparatus for transferring fluid between a storage reservoir and a transport unit. More particularly, this invention relates to tank truck loading arms especially for use in gasoline and other fuel service. Apparatus of this type may be found in the U.S. Pat. Nos. classified in class 137, subclass 615, class 138, subclasses 107, 155 and 177, and class 141, subclasses 387 and 388.

In the transfer of gasoline and other fuels as cargo into tank trucks or similar transport vehicles, it has been found advantageous to employ articulated pipe systems that assure no liquid or vapors will escape to the atmosphere. Some of these pipe systems, or loading arms as they are commonly referred to in the industry, are arranged to load the tank truck through a manhole in its top, while others are designed for loading through an inlet at the tank's bottom. For various reasons the latter, i.e., bottom loading, type of arm has become very popular, and its acceptance is widespread.

Certain styles of tank trucks designed for bottom loading have several cargo compartments each of which is provided with its own inlet, thereby facilitating loading two or more compartments simultaneously and in less time than if they were loaded sequentially. Such a procedure of course requires a plurality of arms at the loading terminal, and these arms must be arranged so that more than one can be coupled to the tank inlets and used at the same time. The location of the inlets varies from vehicle to vehicle, and often the trucks carry more than one grade or type of fluid. Therefore, it may not be possible to employ two or more loading arms at one time without crossing one arm over the other. Making such crossing over possible without interference between the arms, and without unduly restricting their operating area or envelope, are recognized problems.

In addition to the foregoing, the matter is further complicated by tank truck loading requirements that have had industry-wide impact, for example such as American Petroleum Institute Specification Rp-1004, 1st Edition, October, 1967, entitled "Tank Vehicle Bottom Loading and unloading". This API Specification includes requirements that a loading terminal have up to three arms, and that the operator shall be able to couple these arms to any two tank truck inlets on centers not less than ten inches, without doing so sequentially or in any pre-set pattern. Furthermore, the connections must be achievable without interference of any arm at any point within a specified area or envelope, and any two arms must be able to cross-over and be coupled to any inlet within the envelope. Attempting to modify the previously known arms to satisfy this specification has given rise to problems, some of which are not solvable in a desirable manner.

SUMMARY OF THE INVENTION

The present invention comprises an articulated fluid loading arm of novel structure that permits a plurality of such arms to be utilized in any pattern to load fluid cargo simultaneously into the bottom of two or more compartments of a tank truck at a loading terminal. The loading arm of this invention comprises an inboard arm section pivotally mounted on a generally vertical riser through a first vertical swivel joint assembly, an outboard arm section pivotally connected to the inboard section through a second vertical swivel joint assembly, and a coupling assembly pivotally connected to the outboard arm section through a horizontal swivel joint assembly. The outboard arm section is formed by an inner pipe member and an outer pipe member joined together through a horizontal swivel joint assembly that enables the outer member to be pivoted vertically with respect to the inner member, and in the preferred embodiment the inner member includes a horizontal component and a vertical component nonrotatably interconnected through a pipe elbow. The outer pipe member and the coupling assembly are counterbalanced about the axis through the horizontal swivel joint assembly between the inner and outer members, and the means for accomplishing such counterbalancing can comprise a counterweight assembly, a spring assembly, a fluid cylinder assembly, or a gear assembly.

When a plurality of these novel loading arms are installed together as a group or bank, such as at a gasoline tank truck terminal, they are mounted at different heights on their risers so that they can be maneuvered into various positions without interference, and the length of the vertical component of each outboard section's inner pipe member is appropriately sized so that each of the arms in the group can be crossed over all the others and coupled to any cargo inlet of a tank truck properly positioned at the terminal. For example, where an installation of three arms of the invention is involved, the arms are mounted on their risers at three distinct heights, and the lengths of the vertical components of their outboard arm sections are sized commensurately so that the axes through the swivel joints interconnecting the inner and outer members, i.e., the counterbalance axes, are coaxial or suitably spaced. If an installation of four arms is desired, the dimensions of the fourth arm can be the same as that of the middle or second arm of the three, and can be mounted on its riser at the same height as is that second arm.

Accordingly, one object of the present invention is the provision of a new type of articulated pipe, fluid loading arm especially for use in transferring gasoline and other fluid cargo into tank trucks through bottom located tank inlets.

Another object of the present invention is to provide a bottom loading arm that is structured to avoid maneuvering interference with other arms of the same sytle that are mounted close together in an installation at a loading terminal.

Still another object of the present invention is the provision of a bottom loading arm with a novel outboard arm section, including an outer pipe member that is pivotally secured to an inner vertical pipe member through a horizontal swivel joint assembly, and that together with a coupling assembly is counterbalanced with respect to the axis through that swivel joint assembly.

The foregoing and additional objects and advantages of the present invention will become apparent from the following description and the drawings to which it refers.

BRIEF DESCRIPTION OF THE DRAWINGS

FIG. 1 is a side elevation of a tank truck loading terminal equipped with three counterweighted bottom cross-over loading arms according to the present invention, showing the arms partially extended towards a tank truck and the arms' coupling assemblies positioned at three different levels.

FIG. 2 is a plan view of the loading terminal of FIG. 1.

FIG. 3 is a diagrammatic representation, in plan, of the required API operating area or envelope as defined by the reach limits for bottom loading arms set forth in API Specification RP-1004.

FIG. 4 is a side elevation of the envelope shown in FIG. 3.

FIG. 5 is a side elevation, similar to FIG. 1, of a four arm loading terminal according to the present invention.

FIG. 6 is a rear elevation of the loading terminal of FIG. 5.

FIG. 7 is a plan view of the loading terminal of FIG. 5.

FIG. 8 is a diagrammatic representation, in plan, of four loading arms according to the present invention positioned for coupling to four tank truck cargo inlets.

FIG. 9 is a fragmentary view in side elevation of the outer portion of a loading arm of this invention equipped with a tension spring assembly counterbalancing means.

FIG. 10 is a view like FIG. 9, but showing a fluid cylinder assembly counterbalancing means.

FIG. 11 is an enlarged fragmentary view of the fluid cylinder assembly of FIG. 10.

FIG. 12 is a view like FIG. 9, but showing a compression spring assembly suitable for use as a counterbalancing means on a loading arm according to the present invention.

FIG. 13 is a fragmentary sectional view of the spring assembly of FIG. 12.

FIG. 14 is a side elevation like FIG. 9, but showing a gear assembly counterbalancing means.

FIG. 15 is an enlarged fragmentary side elevation of the gear assembly of FIG. 14.

FIG. 16 is a fragmentary view taken along the line 16—16 of FIG. 15.

FIG. 17 is a side elevation like FIG. 9, showing a torsion spring assembly as a counterbalancing means for the loading arm.

FIG. 18 is an enlarged fragmentary view taken along the line 18—18 of FIG. 17.

FIG. 19 is a fragmentary section taken along the line 19—19 of FIG. 18.

DESCRIPTION OF THE PREFERRED EMBODIMENT

As illustrated in FIGS. 1 and 2, the preferred embodiment of a bottom cross-over loading arm 20 according to the present invention comprises an inboard arm section 22 pivotally mounted in a horizontal attitude on a vertical riser 24 by means of a vertical pipe swivel joint 26, an outboard arm section 28 pivotally connected to the inboard section 22 by another vertical pipe swivel joint 30, and a coupling assembly 32 connected to the outboard section 28 by a horizontal pipe swivel joint 34, the coupling assembly 32 facilitating coupling the arm to an inlet means (not shown) of a gasoline or other liquid cargo tank 36 of aa transport truck 38. The swivel joints 26,30 are oriented on vertical axes A,B, respectively, thereby enabling pivotal movement of the inboard and outboard arm sections 22,28 in a horizontal direction.

The outboard arm section 28 comprises an inner pipe member 40 extending from the swivel joint 30, and an outer pipe member 42 pivotally connected to the inner member 40 by a pipe swivel joint 44 oriented on a horizontal axis C. The inner pipe member 40 has a horizontal component 46 and a vertical component 48, these components interconnected in a rigid manner by a pipe elbow 50.

The outer pipe section 42 and the coupling assembly 32 are counterbalanced about the axis C so that they can be easily placed in a desired attitude by the loading terminal attendant or operator, and also to avoid imposing undesired weight on the tank truck inlets. This counterbalancing can be achieved by a counterweight 52 suitably mounted on the pipe section 42 on the opposite side of the axis C (FIGS. 1 and 2).

The coupling assembly 32 comprises a vertical pipe section 54 that extends downwardly from the horizontal swivel joint 34, a vertical swivel joint 56 at the lower end of the pipe 54 and a suitable coupler device 58 connected to the swivel joint 56 by a pipe elbow 60. FIGS. 1 and 2 illustrate a dry-break nozzle type of coupler 58 that is commonly used in the industry for releasably connecting two pipes together. It should be understood, however, that other types of couplers can be employed with the loading arm of this invention, and a valve such as shown at 61 in FIGS. 9, 12, 14 and 17 can be used where its function is desired.

As illustrated in FIGS. 1 and 2 when three of these arms 20,20a,20b are grouped together into one installation, such as at a gasoline loading terminal, the vertical components 48,48a,48b of the arms 20,20a,20b are of different lengths so that the arms can be crossed over one another without conflict. For example, should it be desired to cross loading arm 20a over loading arm 20, the outboard arm section 28 of arm 20 is pivoted laterally about the axis B sufficiently to permit the vertical component 48a, the outer pipe section 42a, and the coupling assembly 32a of arm 20a to pass by as the arm 20a is pivoted about its riser swivel axis A'. Likewise, arm 20b can be crossed over arms 20 and 20a by maneuvering the respective elements of the arms 20,20a about the axes B and B'. Furthermore, arm 20a can be crossed under arm 20b by appropriately pivoting the respective elements of arm 22b about its axis B''. Thus, it should be quite clear that the unique structure embodied in the loading arms 20,20a,20b facilitates crossing them over one another in any order, and thus enables them to be coupled up to any transport tank inlet positioned within their functional envelope.

The arrangement of a four-arm loading terminal provides the same type of cross-over versatility as does that of the foregoing three-arm installation. For example, the three loading arms 62,64, and 66 of FIGS. 5–8 are capable of crossing one another just as are the arms 20,20a and 20b, and the fourth arm 68 can be crossed over arms 64 and 66. This unique advantage is possible because of the novel geometry of the arms of this invention, which geometry prevents interference between adjacent arm elements as one arm is crossed over another.

In both a three-arm installation and one of four arms, the cross-over loading arm of this invention is capable of positioning the coupler 58 in any location within the required operating envelope. The envelope specified by the aforementioned API Specification RP1004 is an area measuring two feet six inches in height, eight feet in width, and one foot in depth, and is positioned one foot six inches above grade level, all as is diagrammatically illustrated in FIGS. 3 and 4. Although this is a relatively small area, it presents no problem when arms according to the present invention are employed at the terminal.

Among the several advantages possessed by the loading arm of the present invention is that it is easily adaptable to various types of counterbalancing systems, rather than being restricted to a single system that might not be as satisfactory as others in certain installations. Although the counterweight 52 is quite adequate for providing the required counterbalancing force, other systems such as springs, pneumatic or hydraulic cylinders, gears, etc., may be employed instead. For example, a simple tension spring, such as that shown at 70 in FIG. 9, may be connected between the vertical component 48 of the inner pipe member 40, as by a suitable bracket 72, and the outer pipe member 42 through a bracket 74.

The fluid cylinder arrangement illustrated in FIGS. 10 and 11 functions quite well as a counterbalancing system on the arm of this invention. The cylinder 76 is pivotally connected to the arm's vertical component 48 by a bracket 78, and its piston rod 80 is pivotally connected to the outer pipe member 42 through a suitable pin and clevis arrangement 82. Although the cylinder 76 could be operated by a pneumatic or hydraulic system, it will function very satisfactorily by maintaining its upper end open to the atmosphere, as by a vent 84, and pressurizing the lower end, as through a valved inlet, until the outer pipe section 42, etc., rise to the desired elevation. The valved line is then closed, and the fluid (air or hydraulic) in the cylinder supports these elements while facilitating their pivotal movement into other higher positions, such as is represented in phantom in FIG. 10.

Another type of counterbalance system for employment on the arm of this invention is the compression spring assembly 88 shown in FIGS. 12 and 13. This assembly essentially is the same as that described in detail in U.S. Pat. No. 3,086,552, issued Apr. 23, 1963 to B. P. Ragsdale, which patent is hereby expressly incorporated by reference, and comprises a plurality of coil springs supported in a housing by guide rods 94, and a movable pressure plate 96 through which the rods 94 extend, and to which a chain 98 is connected, as by a rotatable sprocket 100. The housing 92 is secured to the arm's vertical component 48, and the outer end of the chain 98 is connected to the arm's outer pipe section 42, as through a suitable clevis assembly 102. Thus, the springs 90 support the outer pipe section 42 and coupling assembly 32 in the predesignated position, yet permit vertical pivotal movement thereof into other desired attitudes.

A gear assembly 104 for providing the counterbalancing force for the outer pipe section 42 and coupling assembly 32 is illustrated in FIGS. 14–16. This assembly comprises a housing 106 secured to the arm's vertical component 48 as by a suitable bracket 108 (FIG. 16), a ring gear 110 surrounding and secured to a horizontal portion of the outer pipe section 42, and a pinion gear 112 in mesh with the ring gear 110 and connected by a suitable gear system 114 to an external crank handle 116. Thus, as the handle 116 is cranked, the pinion gear 112 rotates and drives the ring gear 110, thereby pivoting the outer pipe section 42 with respect to the housing 106 and the arm's vertical component 48. A very satisfactory gear assembly of this type is manufactured by the Ben W. Brundage Co., of Oakland, California.

Yet another spring assembly for counterbalancing the outer arm section 42 and the coupling assembly 32 about the axis C is shown in FIGS. 17–19. This assembly 116 includes a helically-wound torsion spring 118 supported in a bracket 120 that is secured to the arm's vertical component 48. A lever arm 122, which is secured to one end of the spring 118 and rotatably supported in the bracket 120 by a shaft 124, extends from the bracket 120 and is pivotally connected to the outer pipe section 42 by a suitable clevis link 126 and bracket 128. The opposite end of the spring is secured to a toothed adjustment plate 130 that can be rotated relative to the bracket 120, and releasably secured non-rotatably to it as by a pawl 132 and bolt 134, to facilitate adjusting the torsional tension on the spring 118. This spring assembly is more fully described in U.S. Pat. No. 3,458,167, issued July 29, 1969 to C. Cooley, Jr., and the content thereof is expressly incorporated herein by reference.

As will be appreciated from the foregoing, numerous advantages are possessed by the bottom loading arm of this invention. It can be crossed over adjacent arms without interference, it has a very short outboard arm section that is quite easily maneuverable by the operator about the axes B and C as compared with other arms where the entire arm must be maneuvered, it has the capability of greater reach into a larger operating envelope, and it will accept most any type of counterbalancing system that one might wish to employ. The cylinderbalanced version is unique in that it is actually supported on a column of air (or fluid), and this is achieved without the need for sophisticated control valves, metering devices, etc., and provides the operator with direct feel of the equipment without having to manipulate a control device. The arm's geometry enables the inboard section 22 to be positioned high enough to provide ample headroom for the operator, and also provides leverages to maneuver the arm's elements from the ground. A minimum number of swivel joints are employed in the arm, thereby keeping costs lower, and yet additional swivel joints can be included if more articulation is desired.

Although the best mode contemplated for carrying out the present invention has been herein shown and described it will be apparent that modification and variation may be made without departing from what is regarded to be the subject matter of the invention.

I claim:

1. An articulated fluid loading arm especially for use in transferring fuel from a storage reservoir into a tank truck through a bottom-located cargo inlet, comprising
   a. an inboard arm section pivotally mounted on an upstanding riser for movement with respect thereto in a horizontal direction,
   b. an outboard arm section pivotally connected to the inboard arm section for movement with respect thereto in a horizontal direction, said outboard arm section including
      1. an inner horizontal pipe section extending from the inboard arm section,
      2. an intermediate vertical pipe section extending downwardly from the inner horizontal pipe section, and 3. an outer pipe section pivotally connected at its inner end to the lower end of the intermediate pipe section by a first pipe swivel joint oriented on a horizontal axis, c. a swivelable coupling assembly for pivotally interconnecting the outer pipe section to a bottom-located tank truck cargo inlet, said coupling assembly having an inlet element and an outlet element, and d. a second pipe swivel joint oriented on a horizontal axis and interconnecting the outer pipe section and the coupling assembly such that the axis of the outer pipe section and the axis of the adjacent portion of the coupling assembly reside in a common plane that is transverse to the axis of said second swivel joint.

2. A loading arm according to claim 1 wherein said common plane extends through the area of the bearing raceway of the second swivel joint.

3. A loading arm according to claim 2 wherein the second swivel joint includes a pair of pipe elbows extending outwardly from said bearing raceway area and wherein said elbows are flattened to reduce the width of said second swivel joint as measured on its axis.

4. A loading arm according to claim 3 including means for counterbalancing the outer pipe section, the second pipe swivel joint, and the coupling assembly about the horizontal axis of the first pipe swivel joint.

5. A loading arm according to claim 4 wherein the counterbalancing means comprises a counterweight assembly.

6. A loading arm according to claim 4 wherein the counterbalancing means comprises a tension spring assembly.

7. A loading arm according to claim 4 wherein the counterbalancing means comprises a compression spring assembly.

8. A loading arm according to claim 4 wherein the counterbalancing means comprises a torsion spring assembly.

9. A loading arm according to claim 4 wherein the counterbalancing means comprises a fluid cylinder assembly.

* * * * *

UNITED STATES PATENT OFFICE
CERTIFICATE OF CORRECTION

PATENT NO. : 3,891,004

DATED : June 24, 1975

INVENTOR(S) : HOUSTON W. KNIGHT

It is certified that error appears in the above-identified patent and that said Letters Patent are hereby corrected as shown below:

Column 1, line 43, "Rp" should be --RP--.

Column 1, line 45 "unloading" should be --Unloading--.

Column 2, line 49, "sytle" should be --style--.

Column 3, line 49, insert --Figure 20 is a fragmentary view in side elevation, and on an enlarged scale, of the horizontal swivel joint interconnecting the outer pipe section of the loading arm with the coupling assembly.
Figure 21 is a view, on a reduced scale, taken along the line 21-21 of Figure 20.--.

Column 3, line 64, "aa" should be --a--.

Column 4, line 28, insert --As shown in general in Figure 2, and in detail in Figure 21, the swivel joint 34 preferably is connected to the outer pipe member 42 and the vertical pipe section 54 by flattened pipe elbows such as 150 and 152 to provide an unusually slender assembly that facilitates simultaneous use of two or more arms of this invention in very tight quarters, as where the tank truck inlets are spaced exceedingly close together. This feature of the invention also enables the axis D (Figure 21) of the outer pipe member 42 and the axis E of the vertical pipe section 54 to reside in a common plane that is transverse to the axis F through the swivel joint 34, and in the preferred embodiment this plan extends through the area of the bearing raceway of this swivel joint.--.

Signed and Sealed this sixteenth Day of March 1976

[SEAL]

Attest:

RUTH C. MASON
Attesting Officer

C. MARSHALL DANN
Commissioner of Patents and Trademarks